(12) United States Patent
Michel

(10) Patent No.: US 11,140,362 B2
(45) Date of Patent: Oct. 5, 2021

(54) METHODS AND SYSTEMS FOR USING IN-STREAM DATA WITHIN AN ON DEMAND CONTENT DELIVERY PATH

(75) Inventor: Walter F. Michel, Glenside, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 12/971,812

(22) Filed: Dec. 17, 2010

(65) Prior Publication Data

US 2011/0138169 A1 Jun. 9, 2011

Related U.S. Application Data

(63) Continuation of application No. 11/075,585, filed on Mar. 9, 2005, now Pat. No. 7,860,013.

(51) Int. Cl.
| | |
|---|---|
| *H04N 7/173* | (2011.01) |
| *H04N 21/234* | (2011.01) |
| *H04N 21/472* | (2011.01) |
| *H04N 21/2389* | (2011.01) |
| *H04N 21/858* | (2011.01) |

(52) U.S. Cl.
CPC ... *H04N 7/17318* (2013.01); *H04N 21/23424* (2013.01); *H04N 21/23892* (2013.01); *H04N 21/47202* (2013.01); *H04N 21/858* (2013.01)

(58) Field of Classification Search
CPC ..... H04L 1/0016; H04L 1/0025; H04L 1/002; H04L 12/18; H04L 12/1845; H04L 12/584; H04L 65/1003; H04L 65/1083; H04L 65/1086; H04L 65/1089; H04L 65/4007; H04L 65/4076; H04L 65/605; H04L 65/607; H04L 67/10; H04L 67/1029; H04L 67/1074–1085; H04L 67/1097; H04L 67/14–148; H04L 69/40; H04W 4/06; H04N 7/17318; H04N 21/238; H04N 21/438; H04N 21/23424; H04N 21/858; H04N 21/47202; H04N 21/23892
USPC ................ 370/241, 242, 244, 245, 248, 250
See application file for complete search history.

(56) References Cited

U.S. PATENT DOCUMENTS

| | | | | |
|---|---|---|---|---|
| 5,455,865 | A | * | 10/1995 | Perlman ........................ 713/153 |
| 5,892,754 | A | * | 4/1999 | Kompella et al. ............ 370/236 |
| 6,616,700 | B1 | * | 9/2003 | Thum et al. ................... 715/273 |

(Continued)

FOREIGN PATENT DOCUMENTS

WO 2005008419 A2 1/2005

OTHER PUBLICATIONS

Canadian Office Action—CA Appl. 2,535,109—dated Oct. 19, 2015.

(Continued)

*Primary Examiner* — Chi Tang P Cheng
(74) *Attorney, Agent, or Firm* — Banner & Witcoff, Ltd.

(57) ABSTRACT

An on demand content delivery platform for delivering on demand digital assets includes a network transport composed of network elements. A content delivery path extends from an application server, through the network transport, to a client. During content delivery, at a network element, data is inserted into the content delivery path to produce a content stream containing inserted in-stream data. In one implementation, the content is conditioned in accordance with instructions present in the in-stream data. In another implementation, the in-stream data represents session information and is utilized for stateless recovery of session information.

32 Claims, 6 Drawing Sheets

(56) References Cited

U.S. PATENT DOCUMENTS

| | | |
|---|---|---|
| 6,751,802 B1 | 6/2004 | Huizer et al. |
| 7,072,305 B1 | 7/2006 | Gregson |
| 7,203,742 B1* | 4/2007 | Luft ..................... H04L 41/048 |
| | | 709/220 |
| 7,289,429 B2* | 10/2007 | Mo et al. ..................... 370/217 |
| 7,684,315 B1* | 3/2010 | Beser ................. H04L 12/2861 |
| | | 370/219 |
| 2002/0152305 A1 | 10/2002 | Jackson et al. |
| 2002/0194614 A1* | 12/2002 | Sawada ................. H04H 20/76 |
| | | 725/118 |
| 2003/0139980 A1* | 7/2003 | Hamilton ....................... 705/27 |
| 2004/0078822 A1* | 4/2004 | Breen ............... H04N 7/17318 |
| | | 725/86 |
| 2004/0128682 A1* | 7/2004 | Liga et al. ..................... 725/35 |
| 2005/0015816 A1* | 1/2005 | Christofalo et al. .......... 725/136 |
| 2005/0018697 A1 | 1/2005 | Enns et al. |
| 2005/0066356 A1 | 3/2005 | Stone et al. |
| 2005/0123001 A1* | 6/2005 | Craven ................. H04J 3/1682 |
| | | 370/486 |
| 2005/0249123 A1* | 11/2005 | Finn ............................. 370/242 |
| 2005/0278760 A1 | 12/2005 | Dewar et al. |
| 2009/0089369 A1* | 4/2009 | Russ et al. ..................... 709/203 |
| 2009/0138966 A1* | 5/2009 | Krause et al. ................... 726/21 |
| 2011/0246203 A1* | 10/2011 | Byrne et al. ................. 704/270 |

OTHER PUBLICATIONS

Canadian Office Action—CA 2,535,109—dated Oct. 26, 2016.
Sep. 27, 2017—Canadian Office Action—CA 2,929,073.
Oct. 2, 2017—Canadian Office Action—CA 2,535,109.
Sep. 7, 2018—Canadian Office Action—CA 2,929,073.
Sep. 26, 2018—Canadian Office Action—CA 2,535,109.
Sep. 23, 2019—Canadian Office Action—CA 2,929,073.
Oct. 7, 2020, Canadian Office Action, CA 2,929,073.

* cited by examiner

METHODS AND SYSTEMS FOR USING IN-STREAM DATA WITHIN AN ON DEMAND CONTENT DELIVERY PATH

CROSS-REFERENCE TO RELATED APPLICATIONS

This application is a continuation of U.S. application Ser. No. 11/075,585 filed on Mar. 9, 2005, the entire contents of which are herein incorporated by reference.

FIELD OF THE INVENTION

The invention relates to on demand content delivery, including delivery of content including video, audio, programs, or data.

BACKGROUND ART

The use of video on demand (VOD) has become widespread. For example, VOD is available in certain cable television (CATV) networks. To implement a video on demand platform it is necessary for the architecture to address resource allocation and to address on demand session management.

In one approach to on demand network architecture, network operators offer video on demand (VOD) services through interactive video systems that feature tight integration and customization across several system components, such as: asset management, session and resource management, billing and entitlement, network transport, and set top client applications.

In a more recent approach to on demand network architecture, an architecture for on demand session and resource management is proposed that is both distributed and scalable. This architecture is suitable for multiple interactive services serving multiple types of devices.

Background information pertaining to a distributed and scalable architecture for on demand session and resource management may be found in international patent application publication no. WO 2005/008419 A2.

Further background information relating to video on demand may be found in U.S. Pat. No. 6,751,802.

As on demand network architectures continue to evolve, a number of challenges are presented. As the number of digital devices at a user location capable of receiving on demand content scales, there is a need for network technology to evolve to address the increased demands while maintaining continuity of service. Most of the issues in this area require maintaining the current state of a session resource pool.

For the foregoing reasons, there is a need for an improved approach to on demand content delivery.

SUMMARY OF THE INVENTION

It is an object of the invention to provide improved methods and systems that use in-stream data within an on demand content delivery path.

The invention involves the use of in-stream data within the on demand content delivery path. The delivered content may include video, audio, programs, or data. By introducing in-stream data into data traversing the various transport segments, a number of challenges faced by evolving on demand network architectures can be overcome.

The data inserted into the transport can be utilized for transport of information useful for, for example, diagnostics, session recovery, content processing, etc. The transport may involve, for example, Internet protocol (IP), and/or hybrid fiber coax (HFC). According to an aspect of the invention, in-stream data can be introduced or consumed by any element in the network including the originating application server, intervening application servers, intervening network elements or clients. Clients may be either a set top box (STB), digital terminal or home computer.

In more detail, the invention comprehends certain uses of in-stream data that improve on demand content delivery. In one implementation, the invention is about conditioning data as it passes through the content delivery path. The in-stream data is actively used in the network. More specifically, conditioning devices along the content delivery path process the on demand stream according to instructions or information present in the inserted in-stream data. In this way, the invention is about processing an on demand stream based on in-stream signaling data.

For example, conditioning devices may be employed to implement encryption or to replace certain portions of the passing data. As well, in-stream data may include diagnostic information, or information relating to the state of the session resource pool. In-stream data may be used to implement high level validation techniques, or flow control at any element in the network.

According to the invention, supplemental data may be carried in the content data, in-stream, as the content data traverses the network segments of the delivery path. The in-stream data can be extracted from the stream for a variety of purposes. At any point in the flow, data may be passed through or added to for delivery to a downstream network element or end point. According to the invention, the in-stream data is actively used in the network by conditioning devices along the content delivery path.

According to another concept comprehended by the invention, the in-stream data may be used to place state information within a service or resource itself. This makes stateless recovery of session resource information possible. In this way, a device manager does not have to support a robust view of the resource usage it controls. In the event of a failure, utilization information can be refreshed in a time consistent with the repetition rate of the in-stream data.

It is further appreciated that the in-stream data, in any of the comprehended applications, may be in the form of in-stream packets, contained within packet headers, or in any other equivalent form. Further, it is appreciated that implementations of the invention may be employed in the preferred architecture for on demand services described herein. It is also appreciated that the described architecture is exemplary, and the invention is not limited to any particular architecture.

DETAILED DESCRIPTION OF THE PREFERRED EMBODIMENTS

1. Architecture 1.1 Architecture Description

Figure 1:
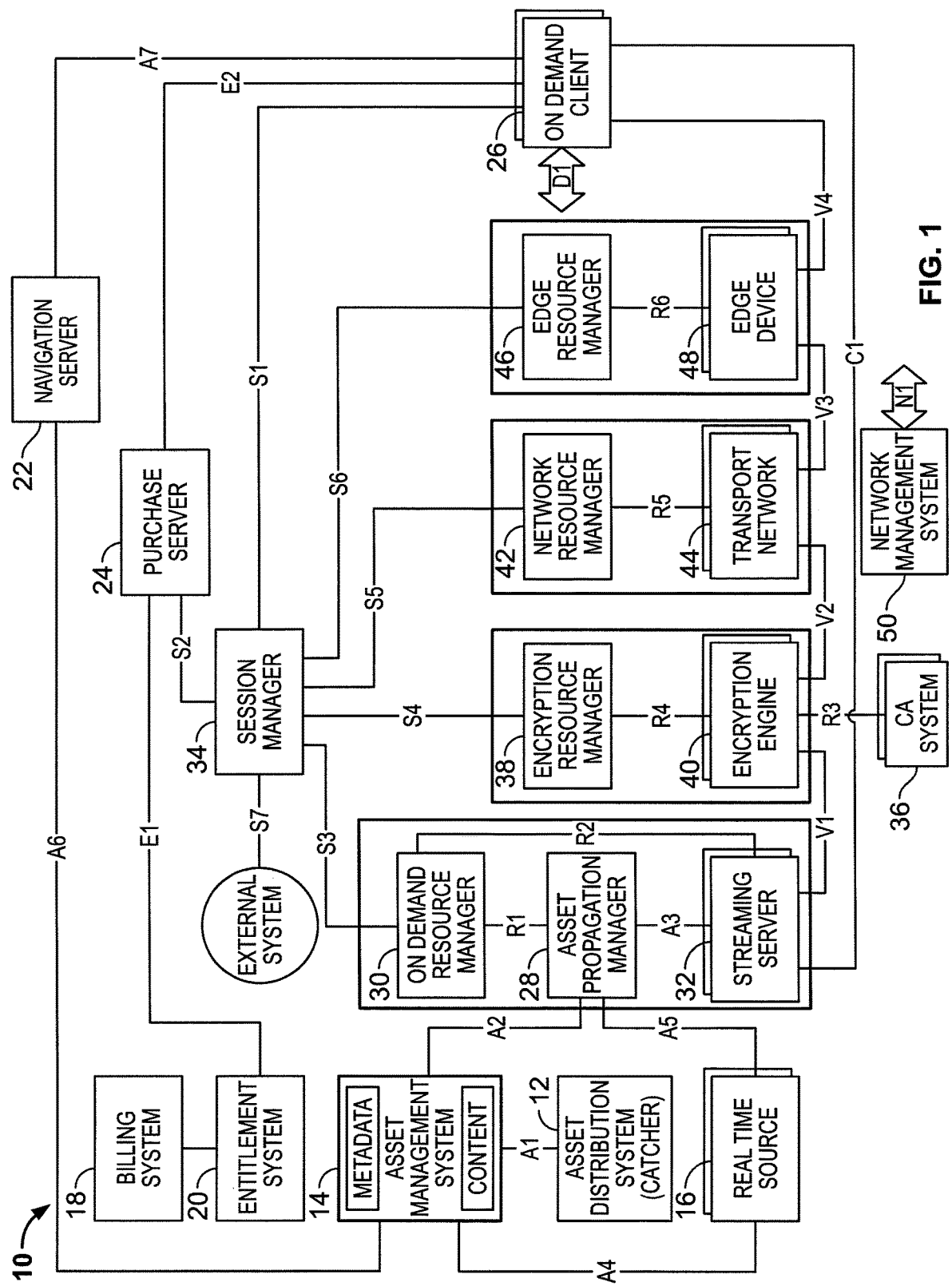
FIG. 1 describes the preferred architecture for on demand video services wherein in-stream data is used within a content delivery path in accordance with the invention.

The block diagram in FIG. 1 describes the exemplary architecture 10 for on demand video services. The initial focus of the architecture will be on the Video On Demand services but the architecture can be expanded to support other on demand services such as Switched Broadcast Video or networked PVR. The Video On Demand service can share the same resource managers and underlying resources with other on demand services.

The architecture consists of a number of logical components and interfaces among them.

Logical Components

The architecture is partitioned functionally into a number of logical components. Each component is defined in such a way that the interchangeable module implementing the common interfaces can be introduced to work with the rest of the system. For example, multiple Streaming Servers can be introduced into the system as long as they implement the defined interfaces.

It is anticipated that in some cases, implementations may integrate several components into a single product or solution. This is viewed as a positive approach, as it may potentially lower both capital and operational costs, as well as potentially increase the efficiency of the overall system. This integration does not mean that each of the logical components does not have to implement the relevant interfaces. For example, certain resource management components might be implemented in an integrated fashion with the Session Manager; in this case the relevant resource management interfaces must still be implemented and exposed.

Each logical entity described in the architecture may represent one or many physical entities in an actual implementation. For example, there may be multiple servers implementing the Session Manager (SM) for the purpose of load balancing and scalability.

The On Demand Client is typically located at the digital set-top box in the subscriber home. Any gateway server that is communicating with the other headend components on behalf of the digital set-top box will be considered as part of the On Demand Client. All other components are located at cable operators' master headend, secondary headend, or remote hub, depending on the specific deployment configuration and network topology. It is desirable to have as much flexibility as possible in the placement of components, to accommodate the various physical deployment scenarios that exist in various divisions and regions. Gigabit Ethernet switching and transport greatly facilitates this, however interfaces need to be designed while keeping in mind that the physical location of various components varies in different deployments.

The key logical components include:
Asset Distribution System (ADS) (12)—distribute asset from content providers' or aggregators' premises to the network operators.
Asset Management System (AMS) (14)—validate and manage life cycle of asset content and metadata.
Real Time Source (16)—generate assets from real time encoder and/or broadcast feeds.
Billing System (18)—manage customer billing and service subscriptions.
Entitlement System (ES) (20)—manage entitlement and transaction.
Navigation Server (22)—present assets and service offerings and manage the navigation from the subscribers.
Purchase Server (24)—receive purchase authorization check from the subscribers and validate via the Entitlement System.
On Demand Client (26)—provide interfaces with the headend components and enable end user application.
Asset Propagation Manager (28)—manage asset propagation across multiple streaming servers.
On Demand Resource Manager (30)—manage resources required at the Streaming Servers.
Streaming Server (32)—output video stream and manage stream control.
Session Manager (SM) (34)—manage life cycle of session for on demand video services requested by subscriber.
Conditional Access System (CAS) (36)—perform Conditional Access for the on demand video services.
Encryption Resource Manager (38)—manage encryption configuration for each session.
Encryption Engine (40)—perform encryption of video service associated with the session, can be located anywhere between video server and edge device.
Network Resource Manager (42)—manage resources required in the transport network for each session.
Transport Network (44)—transport video services from server to edge.
Edge Resource Manager (46)—manage resources required at the edge for each session.
Edge Device (48)—perform re-multiplexing and QAM modulation.
Network Management System (NMS) (50)—provide network management for all the components in the headend.

Although particular functions of these logical components are described below, it is understood that the term "manage" as used herein can include these functions as well additional functions of the logical components.

Interfaces

Defined data and control plane interfaces are necessary. An example of a data plane interface is the asset query format between Navigation Server 22 and Asset Management System 14. An example of a control plane interface is the resource signaling between Session Manager 34 and Network Resource Manager 42.

In addition, defined management plane interfaces are necessary in order to address the management of all the headend components in the architecture. Standard protocols such as SNMP (Simple Network Management Protocol) can be used for this purpose.

The key interfaces (as shown in FIG. 1) can be categorized as follows:
Asset Interfaces: A1 to A7, define asset management interfaces.
Session Interfaces: S1 to S7, define session management interfaces.
Resource Interfaces: R1 to R6, define resource management interfaces.
Entitlement Interfaces: E1 to E2, define entitlement management interfaces.

Stream Control Interfaces: C1, define stream control interfaces.

Client Configuration & Auto-Discovery Interfaces: D1, define client configuration and service group auto-discovery interfaces.

Video Transport Interfaces: V1 to V4, define video transport formats.

Network Management Interfaces: N1, define network management interfaces.

Deployment Configuration

In an actual deployment, a number of key decisions have to be made in the overall system configuration. As long as the functionalities and interfaces are consistent with those described herein, one can use a variety of deployment configurations. For example, these may include:

Distributed or centralized deployment architecture (e.g. video servers, asset management systems, or Session Manager).

Native or middleware based approach.

Network transport mechanism (e.g. Gigabit Ethernet, SONET).

Locations of various headend components (e.g. multiplexer, encryption engine, or QAM).

Application and business logic.

Figure 2:
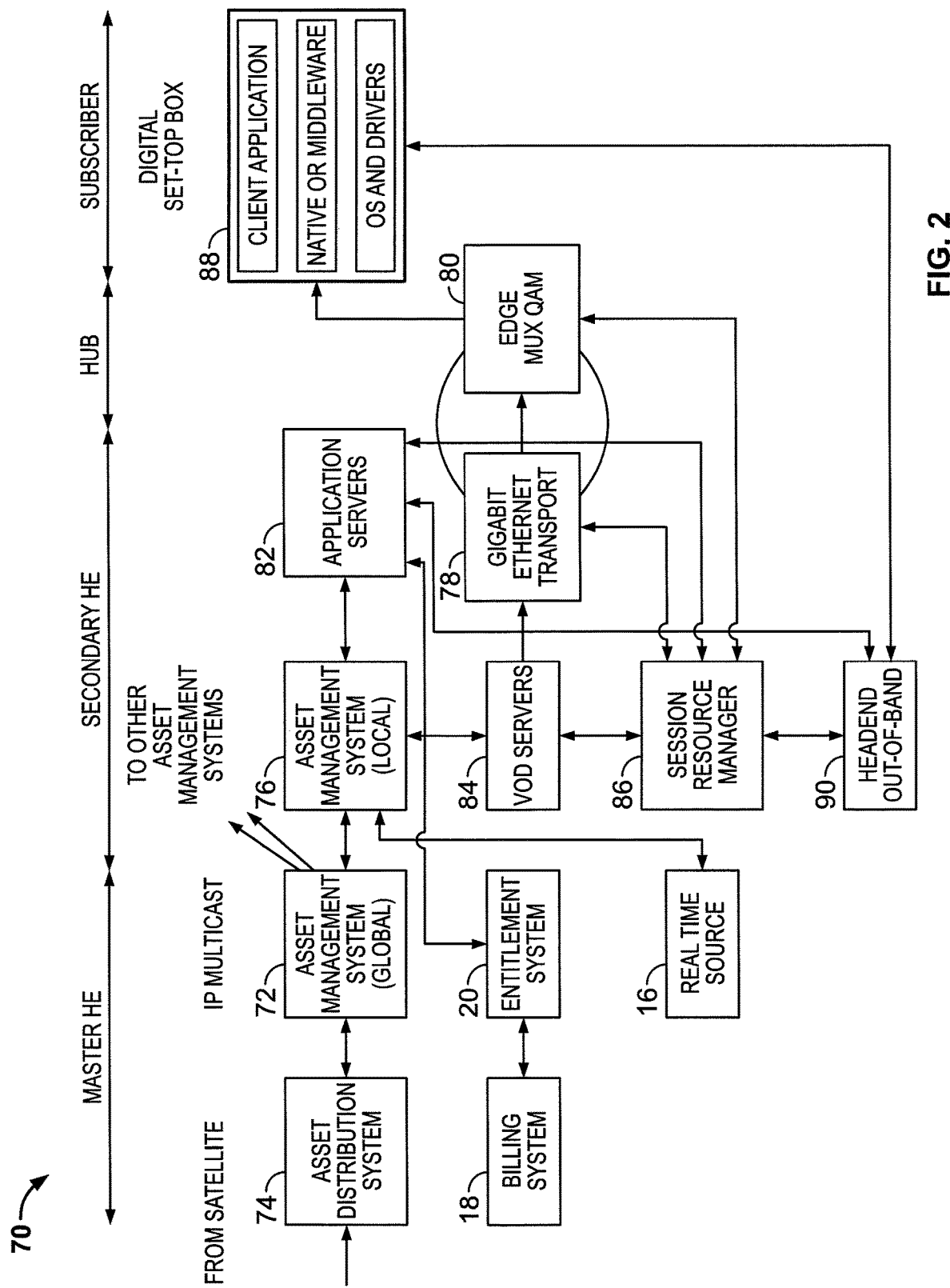
FIG. 2 describes an example VOD deployment architecture.

An example VOD deployment architecture 70 is described in FIG. 2. In this example, a global Asset Management System 72 is used at the master headend to aggregate assets from the Asset Distribution System 74. It serves multiple local Asset Management Systems 76 at secondary headends. In addition, Gigabit Ethernet network transport 78 is used in conjunction with Edge QAM devices 80. Architecture 70 also includes Application Servers 82, VOD Servers 84, Session Resource Manager 86, Digital Set-Top Box 88, and Headend Out-of-Band (block) 90.

1.2 Logical Component Descriptions

Asset Distribution System (ADS) (12)

An asset is combination of the Content (e.g. MPEG files, graphics) and the metadata that describes the Content (e.g. title, duration, encoded bit rate). The Asset Distribution System (ADS) is used to transport assets from content providers' or aggregators' premises to the cable operators' media center or headend.

Typically, the Asset Distribution System (ADS) contains one or multiple Pitchers that broadcast assets over a distribution network to multiple Catchers. The Catchers will temporarily store the assets before they are transferred to the Asset Management System (AMS).

The other functionalities of ADS may include:

Multiple physical network support: satellite, IP backbone, etc.

Multiple transport support: broadcast, IP multicast, unicast, etc.

Private encryption schemes

Asset scheduling, updating, and reporting

Asset Management System (AMS) (14)

The Asset Management System receives asset packages that include asset metadata and content files from the Asset Distribution System using the Asset Distribution Interface (Interface A1). A number of processing steps will happen at the AMS. They may include:

Receiving and storing of asset package (via Interface A1)

Asset metadata validation

Asset metadata modification

Asset life cycle management (create, modify, delete, etc.)

Delivering asset to Asset Propagation Manager (via Interface A2)

Publishing asset metadata to Navigation Server (via Interface A6)

In an actual deployment, multiple Asset Management Systems can be used to provide hierarchical asset management and propagation. For example, a global AMS can be deployed at cable operator's media center and interface with ADS. It will populate assets to several local AMS at the cable operator's headend. Interfaces such as IP multicast can be used between global and local AMS. For the purpose of the illustrated embodiment, the global or local AMS is treated as a single logical entity in the architecture.

It is desired that the AMS provides unified asset management to manage a variety of assets. These may include movies, HTML files, graphics, music, and real time contents such as those provided by the real time encoders or digital broadcast feeds. It may be necessary for the AMS to provide interfaces with TV programming guide data providers to achieve this goal.

Real Time Source (16)

In a typical VOD system, the video assets are pre-encoded and packaged before distribution through the Asset Distribution System. On the other hand, several services require that video is encoded real time or recorded from digital broadcast feeds at the cable operator's location. For example, Free VOD service: broadcast video can be encoded at the cable operator's headend in real time.

Networked PVR: analog broadcast programming can be encoded and captured. Digital broadcast programming can be recorded.

In all these cases, the real time video assets with metadata are imported into the Asset Management System (AMS). Associated trick mode files may have to be generated at the Streaming Server. This process is usually called real time ingest.

Billing System (18)

There are several main functionalities of the billing system for on demand video services. They may include:

Subscriber information management

Subscription of services for each subscriber based on service definition and subscriber ID Billing and transaction information collection The architecture uses the Entitlement System to provide an interface abstraction layer to the billing system.

Entitlement System (ES) (20)

The Entitlement System (ES) provides an interface link between the on demand system and cable operator's billing system. Typically, the ES will implement billing interfaces that integrate with the billing system. The ES then provides open interfaces to other components in the on demand architecture to enable entitlement management.

There are several main functionalities of the Entitlement System (ES):

Abstraction of on demand offering called a Service. For example, the provider could offer a movie on demand package as a Service uniquely identified with ID, description, price, etc. The key part of the Entitlement Validation process is to answer the question of whether the subscriber is entitled to receive the Service.

Subscribers purchase Services through a variety of channels. The aggregate of a subscriber's subscription to Services are recorded in the Billing System. The Subscriber will have to send the purchase request message to the Purchase Server that will perform an entitlement check with the ES. The Purchase Server "knows" the relationships between particular Applications and Services. The Entitlement Validation process at the ES "knows" the relationships between particular Services and the set-top box/subscriber ID with its authorized billing system specific code by accessing the replicated subscriber database data of the billing system.

If the subscriber is entitled and makes a specific purchase, the transaction is posted to the ES via the Purchase Server. It is the Purchase Server's responsibility to monitor the client application status and post transaction to the ES. The ES will then post the transaction to the billing system via billing interfaces. The ES is also responsible for other entitlement functions such as credit check.

Navigation Server (22)

The architecture described herein uses the Navigation Server as the logical entity to abstract application specific logic for asset navigation of on demand services. The Navigation Server obtains information necessary for the on demand application from other components, such as the asset list and metadata from the Asset Management System. The Navigation Server presents the navigation menu and related application features to the On Demand Client and exchanges messages with the On Demand Client to enable the navigation functions. Defined server side interfaces are necessary. Specifically:

Asset publishing: the Navigation Server needs to query and update the asset metadata from the AMS (via Interface A6). The timeliness of the asset status update is critical to a quality of end user navigation experience.

The Navigation Server may provide other application specific functionalities. For example, a Movie On Demand (MOD) Navigation Server can provide the following functions to the subscribers:

Menu, logo, and background images of MOD application.
Navigation of movie catalog, genre, etc.
Detailed information about a specific movie.
VCR control bar for viewing of movie.

Various techniques can be used to optimize the application presentation and logic. These may include the usage of MPEG background, On Screen Graphics (OSD), HTML/JavaScript, Java, or native approaches.

Purchase Server (24)

The architecture uses the Purchase Server as the logical entity to abstract application specific logic for purchase and authorization of on demand services. The Purchase Server obtains information necessary for the on demand application from other components, such as the subscriber entitlement information from the Entitlement System. The Purchase Server receives the purchase requests from the On Demand Client and checks the Entitlement System to enable the purchase authorization. Several defined server side interfaces are necessary. Specifically:

Entitlement interface: the Purchase Server needs to interface with the Entitlement Validation process of the ES for authorization of the service (via Interface E1). The subscriber entitlement information that the Purchase Server retrieved from the ES may be cached to reduce latency.

Session authorization: the session signaling message from the Session Manager needs to be sent to the Purchase Server for real time authorization of the session (via Interface S2). The completed session should constitute a transaction that needs to be posted to the ES by the Purchase Server.

The Purchase Server may provide other application specific logics. For example, a Movie On Demand (MOD) Purchase Server can provide the following functions to the subscribers:

Purchase PIN management
Parental control PIN management
"My Rental" list

It is possible that the Navigation Server and Purchase Server are implemented in one combined module called the Application Server that may also provide other application functionalities. For the purpose of the illustrated embodiment, they are treated as separate logical components.

On Demand Client (26)

The On Demand Client is defined as a collection of the modules at the digital set-top box that implement the messages and protocols to communicate with the necessary headend components. Defined and standardized messages and protocols are necessary to allow the same architecture to support a variety of current or future digital set-top boxes and other devices.

The key messages and protocols between the On Demand Client and headend components include:

Asset messages: query and update the list of assets and their metadata with the Navigation Server (via Interface A7).
Entitlement messages: request purchase authorization for a particular service with the Purchase Server (via Interface E2).
Session signaling protocols: session setup or teardown interfaces with the Session Manager (via Interface S1).
Stream control protocol: VCR control interfaces with the assigned Streaming Server (via Interface C1).
Client configuration and auto-discovery interfaces: configuration parameters for the client such as IP address of the Session Manager. Auto-discovery of the service group that client belongs to should be addressed as well (via Interface D1).

It is entirely possible that a gateway server can be used to translate client protocols optimized for a variety of set-top boxes to common protocols used to interface with the headend components. In this case, the definition of the On Demand Client can be extended to include the gateway server. The interface between the gateway and various headend components should be standardized. The client specific protocols between the client and the gateway can be optimized for different types of digital set-top boxes. For example, for low end set-top boxes with limited out-of-band channel, processor, and memory capacity, a data carousel is commonly used to broadcast top asset lists and their metadata to the On Demand Client. Two-way asset query via an out-of-band channel combined with an in-band downstream channel may also be used. For set-top boxes with a DOCSIS modem and more processor power and memory capacity, asset query via a DOCSIS channel is more feasible.

Asset Propagation Manager (28)

The Asset Propagation Manager is responsible for propagating the assets coming from the AMS to the appropriate Streaming Servers (via Interfaces A2 and A3). This important function is sometimes called "Propagation Service". The policy of the Propagation Service may be determined by a number of factors. For example Storage capacity: determine if there is enough storage for content files.
Content duplication: determine whether the content needs to be duplicated in a distributed manner.

A defined interface between the Asset Propagation Manager and Streaming

Server (Interface A3) is necessary so that Streaming Servers from multiple vendors can be introduced to work within the same propagation service framework. It is necessary that this interface hide the internal implementation of the storage system of the Streaming Server. The interface may include parameters such as the required storage capacity, the available storage capacity, service group coverage, and whether to duplicate a content file.

On Demand Resource Manager (30)

The On Demand Resource Manager is responsible for allocating and managing the resources that are required from the Streaming Servers. Upon the session setup request from the client, the Session Manager (SM) will request resources from the On Demand Resource Manager (via Interface S3), in conjunction with the resources of other components in the overall system. The resources allocated by On Demand Resource Manager may include:

Asset location: This includes the locations of the requested asset that has been determined by propagation services. This information may be retrieved from the Asset Propagation Manager (via Interface R1).

Server resource: This includes the availability of the Streaming Server that contains the asset and covers the service group the requested subscriber resides (via Interface R2).

Network resource: This includes the network resource allocated at the selected Streaming Server output port (via Interface R2). They may include the UDP port number and IP address that carries MPEG SPTS.

The Session Manager (SM) will need to negotiate with On Demand Resource Manager and resource managers for other components to allocate resources to enable streaming video from any server to any edge. For example, the asset files may not be available in the streaming server that is connected to the identified network path to the subscriber. An alternate server and network path may have to be used. Therefore, the SM will need to negotiate with the On Demand Resource Manager and other resource managers to reconcile the differences. This capability is necessary in the interface between the SM and On Demand Resource Manager (Interface S3).

Streaming Server (32)

The Streaming Server is responsible for streaming digital video to the digital set-top boxes using the Hybrid Fiber Coax network via the transport network and edge devices. In a typical system, large storage disk arrays are used to store MPEG video content with fault tolerance capability. The servers typically output MPEG-2 Single Program Transport Streams (SPTS) over UDP/IP and Gigabit Ethernet.

Typically, single or multiple Streaming Servers may be deployed across the network. Streaming Servers may be deployed at a centralized headend or at distributed remote hubs or both. The choices of deployment architecture can be driven by a number of factors such as operational feasibility, network transport availability, scalability, content caching and propagation, and the overall cost.

It is the intent to define the architecture and interfaces in such a way that allows the introduction of new low cost and high performance video servers, leveraging future innovations in storage, networking, and content distribution technology. The architecture and interfaces should enable the deployment of the Streaming Servers from multiple vendors within the same headend, serving the same client devices.

Typically, the Streaming Server also handles the VCR like stream control such as pause, fast forward, fast rewind etc. The trick mode files for contents can be generated ahead-of-time or on the fly by the Streaming Server.

Session Manager (SM) (34)

The Session Manager (SM) is responsible for managing the life cycle of sessions for on demand services.

On demand applications often require the establishment of sessions. A collection of server and network resources needs to be reserved for the session for a certain duration of time. Typically, the SM will perform the following functions:

Communicate with the subscriber device regarding session setup, session status, and session tear down.

Interface with the corresponding Purchase Server to authorize the session requested by the subscriber.

Allocate the resources required for the session by negotiating with the resource managers for appropriate server and network components.

Dynamically add, delete, or modify the resources associated with the session to support integration of multiple on demand services.

Manage the Quality of Service for the session.

Manage the life cycle of the sessions.

One of the main functions of the SM is to obtain required resources for the session by negotiating with resource managers of the relevant server and network components. They include:

Interface with the On Demand Resource Manager to determine the Streaming Server resources such as asset location, allocated streaming server and output port, and source UDP/IP parameters etc. (Interface S3)

Interface with the Encryption Resource Manager to determine encryption resources required for the session. (Interface S4)

Interface with the Network Resource Manager to determine the unidirectional path that will route the requested video stream to the edge devices covering the service group the subscriber resides. (Interface S5)

Interface with the Edge Resource Manager to determine the resources used at the edge devices such as bandwidth required and MPEG tuning parameters so that the digital set-top box can tune to the MPEG program that carries the requested content. (Interface S6)

Although the SM manages sessions in very similar fashion for all on demand video services, it is possible that several different profiles for the SM can be defined to further optimize for variety of applications. For example:

Interactive Session Profile can be used to manage interactive sessions such as those used in VOD.

Broadcast Session Profile can be used to manage broadcast sessions such as those used in Switched Broadcast Video services.

In the distributed architecture, each resource manager is responsible for maintaining and updating the topology and resources of the devices it manages and allocating the resources for the session on behalf of the SM. The SM then collects the choices provided by each resource manager and selects an appropriate combination of resources to enable the session.

Conditional Access System (CAS) (36)

The Conditional Access System (CAS) is responsible for the overall security of the on demand video services. In addition to supporting Conditional Access Systems already deployed in the field, the architecture should allow introduction of new CAS in the same or different headends.

In a typical Conditional Access System (CAS), the encryption of digital services can be achieved by using the Entitlement Control Messages (ECM) and Entitlement Management Messages (EMM). ECMs are used to secure the control words that are required to scramble the packets. EMMs are used to enable specific users to retrieve ECMs that are required to decode the control words and descramble the packets.

Open interfaces are required on the CAS to enable the access of ECMs and EMMs as well as other configuration information.

In the case of pre-encryption, EMMs are generated in such a manner to enable a group of digital set-top boxes to access content that has been pre-encrypted and stored at the server ahead of time. In the case of session based encryption, EMMs are generated and assigned to a particular session. The content has to be scrambled on the fly at the Encryption Engine based on the ECMs generated by the CAS.

Whether the content needs to be encrypted may be determined by a number of factors. Content providers can require the asset to be encrypted by enabling the "Encryption" field in the corresponding asset metadata file. Network operators can also require the specific service to be encrypted. In addition, the system should be able to identify which CA system to encrypt the content in case of a multiple CAS headend.

There are a number of ways that EMMs can be transmitted to the digital set-top box. For example, they can be transmitted in the session setup confirm message from the Session Manager, or transmitted in the corresponding MPEG program, or transmitted via the out of band channels. ECMs can also be transmitted in-band or out-of-band.

Encryption Resource Manager (38)

The Encryption Resource Manager is responsible for managing the Encryption Engines and provisioning the encryption resources required by sessions (via Interface R4). These Encryption Engines may be located anywhere from the server to the edge.

The Encryption Resource Manager plays a central role in the case of session based encryption.

Encryption Engine (40)

The Encryption Engine performs real time encryption of the MPEG-2 packets carrying on demand content. It can be located anywhere between the Streaming Servers and Edge Devices. For example, the Encryption Engine may be embedded in the multiplexer or edge QAM devices.

In order to perform the session based encryption, the Encryption Engine needs to retrieve the appropriate parameters such as the ECMs and the EMMs (via Interface R3) from the corresponding CA system.

Network Resource Manager (42)

The Network Resource Manager is responsible for allocating and managing the resources that are required in the transport network (via Interface R5). In other words, the Network Resource Manager needs to identify a unidirectional route that transports the digital video stream from the server to the edge devices covering the right service group and traversing the required set of network resources.

Transport Network (44)

The Transport Network is used to transport video streams from the Streaming Server to the Edge Device, potentially via a number of network devices such as encryption engines. Depending on the implementation, a variety of Transport Networks can be used to carry video streams such as Gigabit Ethernet and ATM/SONET; in all cases the video is carried over the transport network using IP packets. The current prevailing technology is to use IP infrastructure via Gigabit Ethernet. Typically, the requested content is carried over the MPEG SPTS (Single Program Transport Stream) and mapped over UDP/IP at the output of the Streaming Server. Gigabit Ethernet switches and/or routers can be used to transport the stream to the right Edge Device based on the configuration from the Network Resource Manager.

Edge Resource Manager (46)

The Edge Resource Manager is responsible for allocating and managing the resources that are required at the Edge Devices (via Interface R6).

Typically, the Edge Resource Manager needs to know the topology of the service groups that Edge Devices are serving. Upon the resource request from Session Manager for a specific session, the Edge Resource Manager determines the Edge Device to use, input UDP port and IP address, input MPEG program parameters, as well as output frequency and MPEG program parameters. Other functionalities of the Edge Resource Manager may also include the bandwidth management and quality of service. For example, in order to support dynamically added content to an existing session, the edge bandwidth may need to be added to the session offered from the same QAM. Quality of Service can also be provided by using technique such as MPEG bit rate reduction.

Edge Device (48)

The main functions of the Edge Device are to receive the multiple MPEG SPTS carried over UDP/IP from IP transport network, multiplex into MPEG MPTS, and generate QAM modulated signals. The other features of Edge Devices may include:
  MPEG PID and/or TSID remapping
  PCR (Program Clock Reference) re-stamping
  Statistical multiplexing
  Bit Rate Reduction In general, each resource manager described above (On Demand Resource Manager, Encryption Resource Manager, Network Resource Manager, Edge Resource Manager) is a separate logical component and interfaces with at least one system resource as well as interfacing with the session manager. Each resource manager can be shared between different on demand services and shared between different devices (e.g., set-top box, PC).

Network Management System (NMS) (50)

The Network Management System (NMS) is responsible for managing the headend components described in the architecture. Management includes fault detection, status monitoring, and configuration. Commonly used protocols such as SNMP can be used where the appropriate MIBs are necessary for these interfaces.

1.3 Functional Flow Description

To further describe how the architecture functions, several key functional flows are described in this section. They include Asset Management Flow, Entitlement Management Flow, and Session and Resource Management Flow. The functional flows presented here are just an example, and many alternative flows are possible with the architecture described herein.

In each case, the functional flows are shown with wide arrows identified by numbers. These numbers do not necessarily imply the order of the message flows. In fact, some of these message flows may run independently and simultaneously in an asynchronous manner. It is considered that the ability to execute some operations simultaneously (e.g., in parallel) to be beneficial as this approach has the potential to dramatically reduce the amount of latency as seen by the subscribers.

1.3.1 Asset Management Flow

Figure 3:
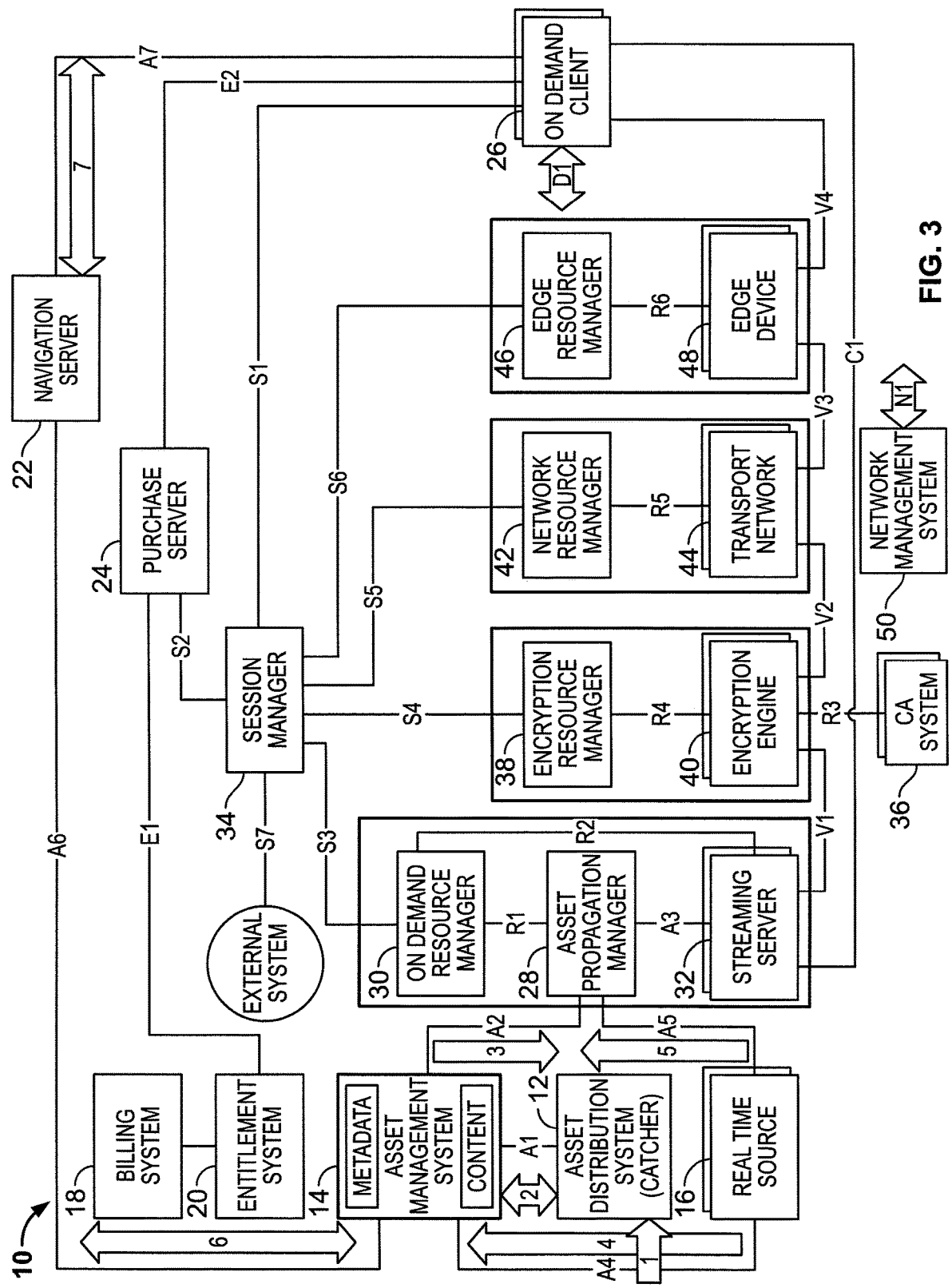
FIG. 3 illustrates the asset management flow.

The Asset Management Flow is shown in FIG. 3. The steps involved in the Asset Management Flow are:
  Step 1: Assets are distributed from content providers' or aggregators' premises to the cable operators' locations via the Asset Distribution System (ADS).

Step 2: ADS transfers the assets to the Asset Management System (AMS) using the structure as those defined in the Asset Distribution Interface (ADI) 1.1. (Interface A1)

Step 3: AMS propagates the assets to the Asset Propagation Manager that will store the content files in the Streaming Server. (Interface A2)

Step 4: AMS interfaces with real time video sources to retrieve the asset metadata information. Information on broadcast programming may be retrieved from the TV programming guide data provider. (Interface A4)

Step 5: Real time content associated with the metadata are encoded, captured, and distributed to the Asset Propagation Manager that will store the content files in the Streaming Server. (Interface A5)

Step 6: The Navigation Server receives and updates the detailed asset metadata information from the AMS. (Interface A6) A pull or push method can be used to load and update asset lists from AMS.

Step 7: The Navigation Server presents a list of assets to the subscribers as part of the service offering. The On Demand Client can navigate the asset list and the metadata information in the service offering. (Interface A7)

1.3.2 Entitlement Management Flow

Typically, the subscriber can order on demand services through a variety means such as calling a Customer Service Representative (CSR) or purchasing the service using a certain user interface at the digital set-top box. Once the service is ordered, it is recorded at the Billing System using the subscriber ID and the billing system specific code for the service. The Entitlement System may access the purchase information from a duplicate database of the Billing System.

Figure 4:
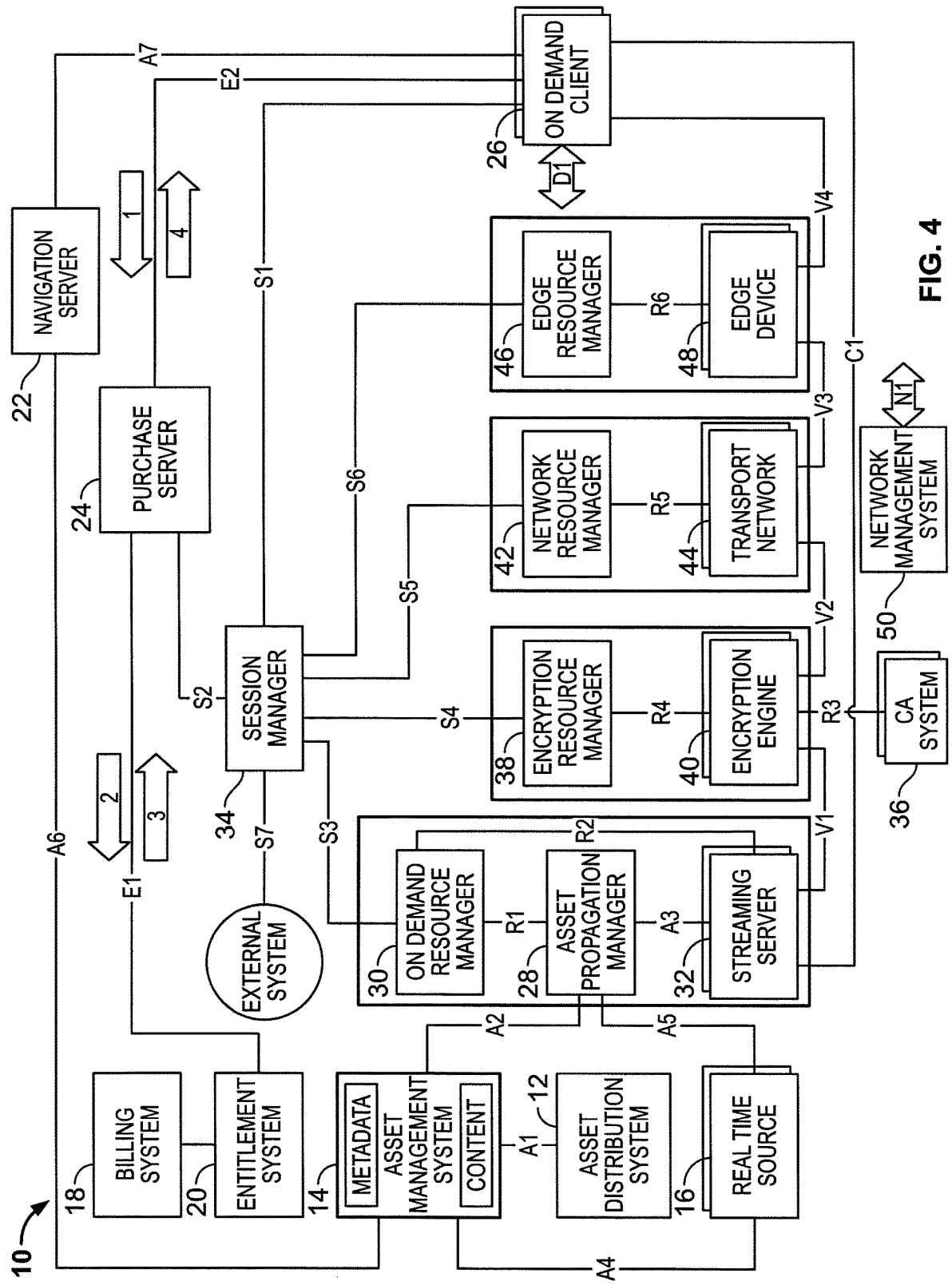
FIG. 4 illustrates the entitlement management flow.

The Navigation Server presents service offerings to the subscribers. If a subscriber wants to access a service, a purchase request message is required to receive the authorization. The Entitlement Management Flow shown in FIG. 4 describes this process:

Step 1: The On Demand Client sends the purchase request message to the Purchase Server. (Interface E2)

Step 2: If the entitlement information for the subscriber on the requested service is not cached in the Purchase Server, it will send the entitlement request message to the Entitlement System (ES). (Interface E1) Otherwise, go to Step 4.

Step 3: The ES checks the entitlement for the subscriber and the requested services in its database. The ES will send the entitlement response message back to the Purchase Server based on the result of entitlement check. (Interface E1)

Step 4: The Purchase Server will send the purchase response message back to the On Demand Client. (Interface E2)

Several schemes can be used to optimize the entitlement management flow once the service has been purchased. For example, the Purchase Server may choose to cache the result from the Entitlement System (ES) after the first time that the On Demand Client requests the purchase. To enable this, the ES must provide expiration information to the Purchase Server via Interface E1, to ensure that only cacheable entitlements are cached, and only for the length of time determined by the ES.

Another approach is to use a token that is assigned by the Purchase Server to the subscriber to access the specific service once the entitlement check results in the authorization of the service. The token is generated and stored at the Purchase Server. It can be sent to the On Demand Client via the purchase response message at Step 4 (Interface E2) and stored in the digital set-top box. The On Demand Client can use the token for future purchase requests with the Purchase Server and/or session authorizations described in the Session and Resource Management Flow. This approach will reduce the traffic and latency caused by the frequent messaging among different components; in particular, implementing a secure token that the Purchase Server can validate without checking repeatedly with the Entitlement System could result in improved performance and scalability.

1.3.3 Session and Resource Management Flow

Figure 5:
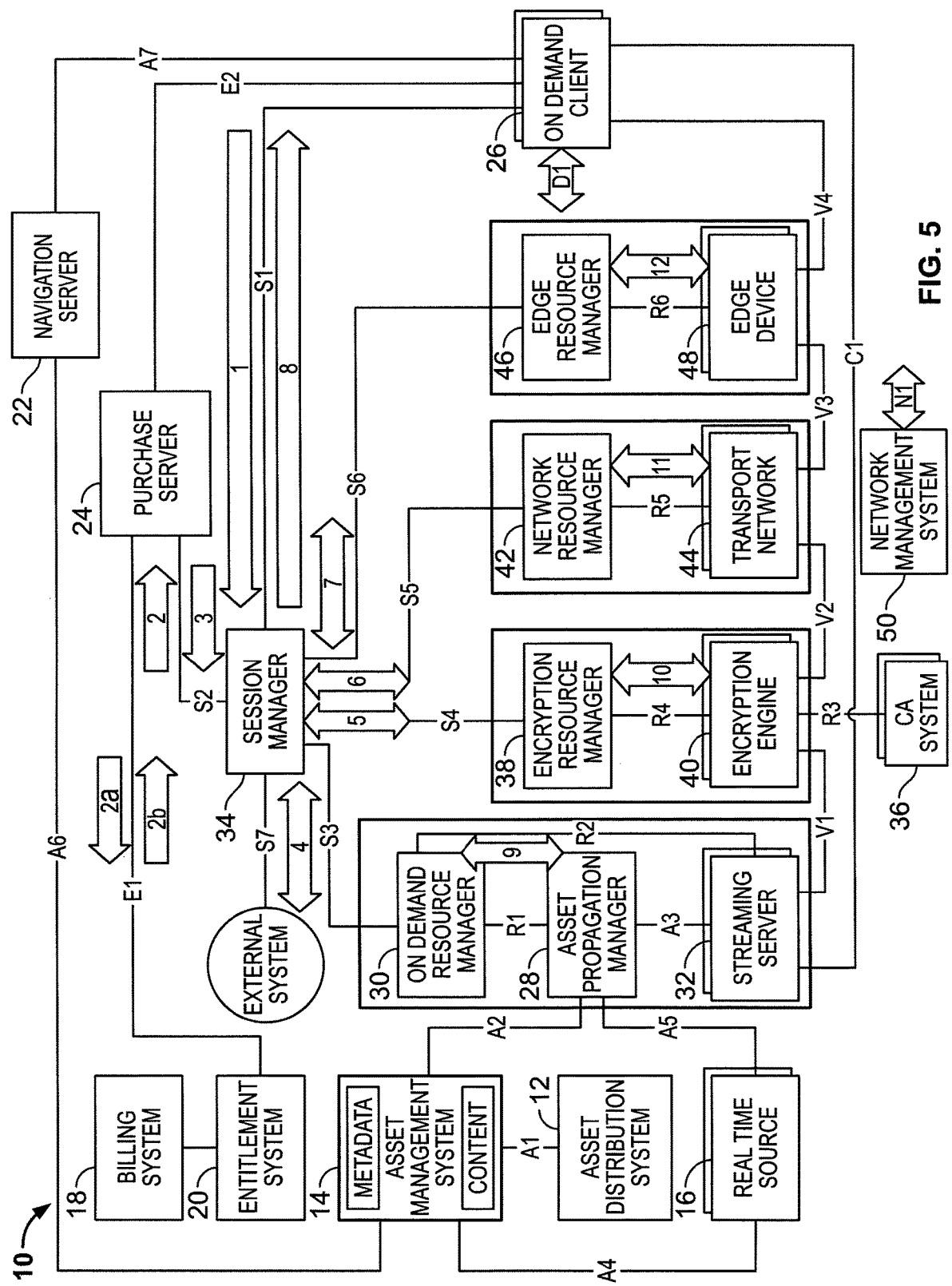
FIG. 5 illustrates the session and resource management flow.

The Session and Resource Management Flow is shown in FIG. 5. The steps involved in the Session and Resource Management Flow are described below:

Step 1: The On Demand Client sends the session setup request message to the Session Manager (SM). (Interface S1) The message may include the service offering, asset ID, and information related to the subscriber's service group etc.

Step 2: The SM sends the session authorization request message to the Purchase Server. (Interface S2) The Purchase Server performs the entitlement check. There are a number of scenarios here:

If the subscriber requests the purchase described in the Entitlement Management Flow before requesting the session, the entitlement information can be cached at the Purchase Server and the session authorization can be done by looking up the information in the subscriber's session request message (e.g. subscriber STB ID, service/asset ID, or the token assigned via the previous purchase request).

If the subscriber has not requested any purchase before requesting the session ("opportunistic session"), the Purchase Server will perform entitlement check with the Entitlement System through Step 2a and Step 2b, as described in the Entitlement Management Flow. (Interface E1)

Step 3: The Purchase Server sends the session authorization response message to the SM. If the session is authorized, go to Step 4, otherwise, it will send session denial message. (Interface S2)

Steps 4 through 7 include resource allocation messages with different resource managers. They can run in parallel or sequential manners depending on the implementation:

Step 4: The SM requests On Demand resources for the session from the On Demand Resource Manager. (Interface S3) These resources may include the location of the asset, the Streaming Server output port, etc.

Step 5: The SM requests encryption resources for the session from the Encryption Resource Manager. (Interface S4) The message needs to pass the CA system to be used and identify the MPEG stream that needs to be encrypted. The Encryption Resource Manager is responsible for selecting and configuring the Encryption Engine (Interface R4) that will retrieve the ECMs and EMMs from the CA system (Interface R3)

Step 6: The SM requests transport network resources from the Network Resource Manager. (Interface S5) The Network Resource Manager needs to allocate the route that will transport the video stream from the server to the edge via any required network devices.

Step 7: The SM requests edge resources from the Edge Resource Manager. (Interface S6) The SM needs to send to the Edge Resource Manager the service group related information from the client session setup request message. The Edge Resource Manager needs to allocate the edge resources such as QAM that covers the corresponding service group.

Step 8: The SM sends the session setup confirm message to the On Demand Client that includes the tuning information such as frequency, MPEG TSID, and MPEG Program Number if applicable. (Interface S1) In addition, the EMM may be sent in this message to handle session based encryption.

Steps 9 through 12 include interfaces between various resource managers and their corresponding devices. Advantageously, they are able to operate independently and asynchronously from each other. The resource managers enable the following functionalities via these interfaces:

- Auto-discovery of the new devices and the configuration information such as IP address.
- Discovery and maintenance of the topology of the devices.
- Dynamic configuration of the devices to enable the allocated resources.
- Tracking of availability of resources, e.g., which resources have capacity available, which are down, etc.

There may be several possible models of how the overall resource management process works. In a centralized model, the SM retrieves and aggregates the topology and resource information from each resource manager. The SM will need to update this information as necessary. The session is assigned with resources in a centralized manner by the SM. The SM will communicate to each resource manager to configure the resources. In a distributed model, each resource manager is responsible for maintaining and updating the topology and resource of the devices it manages and allocating the resources for the session on behalf of the SM. The SM needs to collect the choices provided by each resource manager and select an appropriate combination of resources to enable the session. Several optimizations to this model are also possible to further reduce the latency and increase the throughput of session and resource management.

2. Interface Description

The interfaces identified herein for the architecture are defined in an open, non-proprietary fashion to facilitate multi-vendor environments for deploying on demand services.

These interfaces may belong to one of the following three categories:

- Interfaces that can use existing standards wherever they apply.
- Interfaces that require modification or extension of existing standards.
- Interfaces that require new specifications to be proposed and adopted.

2.1 Asset Interfaces

The asset related interfaces include Interfaces A1 to A7. They are primarily responsible for managing or navigating the asset metadata and content. In addition, they are also responsible for monitoring the status of assets Asset Distribution Interface (A1)

The Asset Distribution Interface between the Asset Distribution System (ADS) and the Asset Management System (AMS) is responsible for distributing content and metadata files from the ADS to the AMS. This interface has been defined in the CableLabs Asset Distribution Interface version 1.1 (ADI 1.1). An asset can be uniquely identified by the combination of Provider ID and Asset ID. In addition, ADI 2.0 introduces the concept of Collection. The content format for VOD has been defined in the CableLabs Content Specification version 1.1.

Asset Ingest Interface (A2)

The Asset Ingest Interface between the Asset Management System and the Asset Propagation Manager is responsible for ingesting assets from the AMS to the Asset Propagation Manager that will propagate the content files into the storage system of the Streaming Server(s). In addition, this interface can provide additional features such as query of the asset existence and deletion of the asset.

Asset Propagation Interface (A3)

The Asset Propagation Interface between the Asset Propagation Manager and the Streaming Server(s) is responsible for managing the propagation of the asset to the storage system within the Streaming Servers. This interface includes the allocation of the Streaming Server location for the asset and the interface for actual content file distribution to the selected Streaming Server.

The Asset Propagation Manager can be tightly coupled with the Streaming Server and its storage infrastructure or it can be a separated module as shown herein. The Asset Propagation Manager applies certain rules to determine where a content file is to be propagated. These rules may be determined from the popularity, content duplication and caching, as well as the storage characteristics. However, the interface should be specified to allow the Asset Propagation Manager to retrieve necessary information from the Streaming Server such as storage availability, storage stability/reliability, streaming capacity, etc.

Real Time Metadata Interface (A4)

The Real Time Metadata Interface between the Real Time Source and the Asset Management System is responsible for collecting the metadata describing the real time content. This may be accomplished by interfacing between the AMS and the TV programming guide data provider. Ways to describe broadcast assets have to be defined at the AMS.

Real Time Ingest Interface (A5)

The Real Time Ingest Interface between the Real Time Source and the Asset Propagation Manager is responsible for ingesting real time content from the Real Time Source to the Asset Propagation Manager that will propagate the content files into the storage system of the Streaming Server(s). This includes the interface to define the start time and end time of the real time ingest process. This interface has to be robust enough to address the fail over of the Real Time Encoders (RTE). While the AMS contents can be re-acquired, the RTE contents can not be.

Asset Publishing Interface (A6)

The Asset Publishing Interface between the Asset Management System and the Navigation Server is responsible for publishing the asset list and metadata from the AMS to the Navigation Server or any other application components. This interface can add, delete, and modify the asset list and metadata. In addition, it can also update the status of assets. Either a pull model or push model or combination can be used.

Client Navigation Interface (A7)

The Client Navigation Interface between the On Demand Client and the Navigation Server is responsible for enabling navigation of the asset list and metadata offered by the Navigation Server. The On Demand Client will perform asset query based on the application flow. Any gateway server that performs asset query on behalf of the digital set-top box will be considered as part of the On Demand Client for the purpose of the illustrated embodiment.

One option for this interface is to leverage standard Web interfaces based on Extensible Markup Language (XML) and Extensible Stylesheet Language (XSL) technology. XSL can be used to transform the XML metadata to the format that can be used by a variety of On Demand Clients.

2.2 Session Interfaces

The session related interfaces include Interfaces S1 to S7. They are primarily responsible for session setup and teardown as well as other session management functions. They are highly real time in nature. Therefore, performance issues such as latency and throughput should be taken into consideration in the interface design.

In general, two standard suites are available and widely used for session protocols: DSM-CC and RTSP. The MPEG Digital Storage Media—Command and Control (DSM-CC) user to network protocols can be used for session setup, teardown, and other related session signaling messages. These protocols typically run over TCP/IP. A subset of DSM-CC has been adopted and several extensions have been made in the Session Setup Protocol (SSP) specification. The Real Time Streaming Protocol (RTSP) is a standard proposed in the IETF, initially addressing real time streaming media over IP but extendable to support HFC network. RTSP is based on the format very similar to HTTP (which, of course, also runs over TCP/IP). The DSM-CC and RTSP approaches differ in industry acceptance, performance, and flexibility.

Client Session Interface (S1)

The Client Session Interface between the On Demand Client and the Session Manager is responsible for signaling messages to/from the On Demand Client. They include client session setup, client session teardown, and other client session management functions such as session heartbeat. Any gateway server that performs session signaling on behalf of the digital set-top box will be considered as part of the On Demand Client for the purpose of the illustrated embodiment.

Session Authorization Interface (S2)

The Session Authorization Interface between the Session Manager and the Purchase Server is responsible for authorizing the session requested by the On Demand Client. The other function of this interface is to identify whether the session needs to be encrypted and which CA system to use based on the device type.

Session and On Demand Resource Interface (S3)

The Session and On Demand Resource Interface between the Session Manager and the On Demand Resource Manager is responsible for negotiating resources required at the Streaming Server for the requested session. The parameters involved may include the asset ID in the request message, assigned Streaming Server and its output port, source UDP/IP parameters in the response message, etc.

Session and Encryption Resource Interface (S4)

The Session and Encryption Resource Interface between the Session Manager and the Encryption Resource Manager is responsible for negotiating resources required at the Encryption Engine for the requested session. The parameters involved may include the UDP Port and IP address of the encrypted stream and the CA system ID in the request message, assigned EMM to be sent back to the On Demand Client in the response message, etc.

Session and Network Resource Interface (S5)

The Session and Network Resource Interface between the Session Manager and the Network Resource Manager is responsible for negotiating resources required at the Transport Network for the requested session. The parameters involved may include the UDP Port and IP address of stream and bandwidth required in the request message, assigned transport network resources in the response message, etc.

Session and Edge Resource Interface (S6)

The Session and Edge Resource Interface between the Session Manager and the Edge Resource Manager is responsible for negotiating resources required at the Edge Device for the requested session. The parameters involved may include any fields indicating the requested subscriber's service group and quality of service level in the request message, allocated edge QAM to use and frequency and MPEG tuning parameters in the response message, etc.

Session Manager External Interface (S7)

The Session Manager External Interface provides mechanism for external systems to check the status of the sessions. In addition, it provides mechanisms to teardown an existing session.

2.3 Resource Interfaces

The resource related interfaces include Interfaces R1 to R6. Various resource managers use these interfaces to manage the resources of the corresponding components. These interfaces allow the resource manager to retrieve configuration, topology, status, and resource availability of the corresponding components. They are highly real time in nature. Therefore, performance is taken into consideration in the interface design. The resource interfaces are typically running in parallel with each other and do not have to be synchronized with the session interfaces.

There are a number of options for the resource interfaces. One candidate is the SNMP based approach. It may be possible to use appropriate standard MIBs to manage the resource of the components. On the other hand, new MIBs may have to be defined to support features specific to each component.

Asset Resource Interface (R1)

The Asset Resource Interface between the On Demand Resource Manager and the Asset Propagation Manager is responsible for allocating the Streaming Server to stream the requested asset. In this model, it is assumed that the Asset Propagation Manager maintains a table of assets and their location(s) on the Streaming Server(s). It will return to the On Demand Resource Manager the location(s) of the Streaming Server(s) that can stream the requested asset.

Streaming Server Resource Interface (R2)

The Streaming Server Resource Interface between the On Demand Resource Manager and the Streaming Servers is responsible for managing the resources of the Streaming Servers. Through this interface, the On Demand Resource Manager will monitor configuration, status, and resource availability of the multiple Streaming Servers. It will use this information to, among other things, make sure that the Streaming Server(s) identified to stream an asset via the Asset Resource Interface (R1) is available and has enough bandwidth capacity to stream the asset.

Conditional Access System Interface (R3)

The Conditional Access System Interface between the Conditional Access System and the Encryption Engine is responsible for assigning appropriate conditional access messages such as ECM and EMM for the Encryption Engine to encrypt a requested session. The Encryption Engine may use identification such as CA System ID to choose the specific CA system to encrypt the session in a multiple CA environment. As a further optimization, the Encryption Engine may request and cache multiple EMMs from the CA system to be used for upcoming sessions. One option for this interface is the DVB Simulcrypt interface.

Encryption Resource Interface (R4)

The Encryption Resource Interface between the Encryption Resource Manager and the Encryption Engine is responsible for managing and allocating encryption resources. Through this interface, the Encryption Resource Manager will monitor configuration, status, and resource availability of the multiple encryption engines. It will choose the appropriate encryption engine for each session based on current encryption engine availability, type of encryption required, and other factors. The Encryption Engine is responsible for returning the EMM assigned by the Conditional Access System for the session to the Encryption Resource Manager, if the EMM needs to be sent to the client as part of the session setup confirmation process.

Network Resource Interface (R5)

The Network Resource Interface between the Network Resource Manager and the Transport Network is responsible for managing and allocating transport network resources. Through this interface, the Network Resource Manager will monitor configuration, status, and resource availability of the multiple components in the transport network path, such as a Gigabit Ethernet Switch(es). It will also reserve appropriate bandwidth resources in the selected network path. Standards such as RVSP have already been defined in IETF to address some of these issues. It is desirable to leverage standard protocols for this interface with minimum modifications, where appropriate.

Edge Resource Interface (R6)

The Edge Resource Interface between the Edge Resource Manager and the Edge Device is responsible for managing and allocating edge resources. Through this interface, the Edge Resource Manager will monitor configuration, status, and resource availability of the multiple edge devices for various service groups. It is assumed that the Edge Resource Manager maintain the mapping of the edge devices and the service groups they cover. It will choose the appropriate edge device and identify the stream using UDP port number and IP address. The frequency and MPEG tuning information for the session will be determined by the Edge Device and returned to the Edge Resource Manager.

2.4 Entitlement Interfaces

The Entitlement Interfaces including Interfaces E1 to E2 are responsible for performing entitlement validation and purchase authorization.

Entitlement Validation Interface (E1)

The Entitlement Validation Interface between the Purchase Server and the Entitlement System is responsible for performing entitlement checks. It will require subscriber ID and the service being purchased. To further optimize performance, it is possible that the Purchase Server will cache the result of the entitlement check as long as the Entitlement System provides the expiration time for each entitlement. This is so that when the session manager requests an authorization via interface S2, the purchase server will be able to answer the request without going back to the entitlement system.

Client Purchase Interface (E2)

The Client Purchase Interface between the On Demand Client and the Purchase Server is responsible for performing purchase authorization check for the selected service offering. Any gateway server that communicates with the Purchase Server on behalf of the digital set-top box is considered as part of the On Demand Client for the purpose of the illustrated embodiment. Through this interface, the On Demand Client will send purchase request messages to the Purchase Server. The Purchase Server will be responsible for determining if the subscriber is authorized to purchase the selected service by either checking the cached result or performing an entitlement check as described in the Entitlement Validation Interface. The Purchase Server will send the purchase response message to the On Demand Client indicating whether the purchase is authorized or not.

2.5 Stream Control Interfaces

The Stream Control Interface (Cl) supports VCR like "trick modes" such as play, pause, fast forward, and reverse. Like session management, the interface may either adopt DSM-CC or RTSP standard. In the DSM-CC case, the DSM-CC user-to-user specification has previously been adapted as the Lightweight Stream Control Protocol (LSCP). In the RTSP case, it provides the stream control in the HTTP like common framework. Typically, the stream control messages are handled directly by the Streaming Server to ensure the low latency.

2.6 Client Configuration & Auto-Discovery Interfaces

The Client Configuration and Auto-discovery Interfaces (D1) are responsible for configuring the On Demand Client with initialization parameters, and allowing the On Demand Client to discover its own Service Group automatically.

The initial configuration parameters include the IP address of the Session Manager and other headend components that the client needs to communicate with. There are many ways to deliver the information to the client, such as data carousel and out-of-band messaging for the low end set-top box, or DOCSIS provisioning system (e.g. DHCP options and TFTP config file options) for the DOCSIS capable digital set-top box. It is desirable to standardize on some common message structures that can be carried over these transport mechanisms.

The auto-discovery scheme can be used to enable the client to discover its own service group automatically. For example, the client can identify its service group using a set of unique MPEG Transport Stream IDs assigned by the Edge QAM for the corresponding service group. It is desirable to standardize an open approach to achieve client auto-discovery.

2.7 Video Transport Interfaces

The Video Transport Interfaces including Interfaces V1 to V4 are responsible for delivering on demand contents.

Source Transport Interface (V1)

The Source Transport Interface specifies the protocol used to carry on demand streams at the output of the Streaming Server. For Gigabit Ethernet outputs, the mapping of MPEG-2 Single Program Transport Stream (SPTS) over the UDP/IP is used. Several standards exist for this interface and a common scheme should be identified.

Encrypted Transport Interface (V2)

The Encrypted Transport Interface specifies the protocol used to carry on demand streams that have been encrypted by the appropriate encryption engine. Typically, MPEG-2 Single Program Transport Stream is encrypted and carried over UDP/IP. MPEG-2 transport protocol may be used to specify where to carry ECMs or EMMs if they are delivered in the stream. It is desirable that this interface be the same format as Interface V1.

Network Transport Interface (V3)

The Network Transport Interface defines the protocol used to carry on demand streams in the core IP network from the server to the edge, before or after the encryption. For Gigabit Ethernet outputs, the mapping of MPEG-2 Single Program Transport Stream (SPTS) over the UDP/IP is typically used. Several standards exist for this interface and a common scheme should be identified. It is desirable that this interface be the same format as Interfaces V1.

Client Transport Interface (V4)

The Client Transport Interface defines the protocol used to carry on demand streams at the output of edge devices such as QAM modulators and CMTSs. MPEG-2 Multiple Program Transport Stream (MPTS) over QAM is typically used for QAM modulators; in the DOCSIS case, the DOCSIS standard defines Layer 3 and below, but does not define the streaming format. This interface will be compliant to the relevant standards while additional processing such as bit rate reduction and PCR re-stamping may be used.

It is possible that the additional content (e.g. ITV) are encoded in the MPEG format and delivered in-band to the digital set-top box. Typically the contents need to be pre-processed in a format that is optimized for particular types of digital set-top boxes by a separate server.

2.8 Network Management Interfaces

The Network Management Interfaces (N1) between the Network Management System and all the components in the architecture described herein are responsible for the overall network management functions. The Simple Network Management Protocol (SNMP) is commonly used for the Network Management Interfaces.

The Network Management Interfaces are primarily intended to interface with an external Network Management System. It is possible that a portion or all of any MIBs defined for the internal resource management purposes (R1 to R6) can be used as part of the Network Management Interfaces if the SNMP approach is adopted for those interfaces as well. Additional MIBs will be needed for other components in the system.

3. Additional Services

The architecture and associated interfaces can support multiple services, such as Networked PVR, Interactive Digital Program Insertion, Switched Broadcast Video, and streaming media delivery to PCs and other "end to end IP" devices.

3.1 Networked PVR

Networked PVR (nPVR) services allow the subscriber to watch broadcast programming on demand and interact with a live broadcast programming (e.g. pause or rewind). To effectively achieve this goal, the network operator must record and store broadcast programming in real-time, and manage each subscriber's on demand requests to broadcast content.

The architecture and associated interfaces described herein can support these features. In particular, The real time asset ingest can be imported to the Streaming Servers. The metadata can be imported to the Asset Management System. These metadata can include the programming schedule information.

The segmentation of the digital video programming (start and end of the programming segments) should be addressed. An operationally friendly scheme is also required to address the programs that start late and overrun their original schedule.

For time shifting contents, the subscriber will be able to perform asset query, purchase authorization request, and session setup/teardown just as any video on demand service.

For live broadcast, the subscriber will request a Networked PVR session triggered by a command such as Pause. The subscriber can choose to resume watching the live broadcast.

Session based encryption can be applied to the Networked PVR services, and/or real-time pre-encryption can be performed.

The networked PVR service can share the same resource managers and underlying resources with other on demand services. The Streaming Server will be required to handle large amount of real time stream ingest. The Session Manager and Resource Managers will be required to manage a large number of simultaneous sessions in cases such as a popular live broadcast. It is necessary that the architecture and interfaces described herein take these issues into consideration.

3.2 Interactive Digital Program Insertion

The architecture opens new opportunities for providing innovative interactive advertising offerings. For example, an advertisement can be inserted at the beginning of a VOD session. The advertisement can be either determined statically based on the asset metadata or dynamically targeted to a particular subscriber based on a set of business rules.

From the architectural perspective, there are several areas of interests in supporting the interactive program insertion services. They include: where the digital insertion will happen, how it can be done, and what determines the digital insertion stream.

The digital program can be inserted either at the Streaming Server location or at the Edge Devices. Insertion at the Streaming Server provides integrated approach and can leverage existing storage and streaming infrastructure. Insertion at the Edge Devices will allow a separately managed Ad server to interface with Edge Devices, eliminating the requirement for a given ad to be stored on the same server as the content it is being inserted in.

In both cases, CableLabs Digital Program Insertion standards can be used to provide cueing messages as required for splicing of MPEG-2 streams. In addition, digital program insertion to the encrypted stream should be handled properly. The specific business rules that determine the advertisement insertion may vary depending on the service requirements.

3.3 Switched Broadcast Video

The architecture can support Switched Broadcast Video services. A switched broadcast system will only send the digital broadcast video stream that the subscriber is watching to the corresponding service group. In addition, the subscriber can join an existing multicast that is available to the corresponding service group. The Switched Broadcast Video service can share the same resource managers and underlying resources with other on demand services.

In more precise terms, Switched Broadcast Video is a tool to save bandwidth rather than a new service. From the subscriber perspective, he or she still receives the same broadcast video service when using switched broadcast technique; ideally the user is not able to tell that the stream was switched at all. If each one of the digital broadcast channels is being watched by subscribers in the same service group, the Switched Broadcast Video approach does not yield any bandwidth savings. However, a more likely situation is that statistically only a certain number of the digital broadcast channels are being watched by subscribers in the same service group. One can take the advantage of this to achieve bandwidth saving by using the Switched Broadcast Video technique. The "concentration ratio," dependant on users' viewing patterns is one of the key factors in consideration of the bandwidth efficiency of the overall Switched Broadcast Video solution.

One way to support Switched Broadcast Video is to utilize the Session Manager to manage broadcast sessions. For each channel change, the subscriber will set up a broadcast session with the Session Manager who will determine if the requested channel is already sent to the corresponding service group that the subscriber belongs to. The subscriber will be assigned to join the existing broadcast session if the requested channel is available at the service group or assigned to a new broadcast session if the requested channel is not available at the service group. The Session Manager will negotiate with the Resource Managers to allocate resources required for the session. The Edge Device needs to dynamically retrieve the MPEG single program transport stream that carries the requested broadcast program (likely via IP multicast) and generate the MPEG multiple program transport stream. As part of the session setup response message, the video tuning parameters such as frequency and MPEG program number are sent back to the subscriber to access the requested broadcast channel.

Switched Broadcast Video imposes specific requirements on the performance of the overall system. For example, the broadcast session setup/channel change latency needs to be minimized to achieve desired channel change response time. In addition, frequent channel hopping in peak time can cause significant upstream traffic required to carry session messages.

3.4 Shared Streaming Media Platform

The architecture allows sharing of the on demand video service infrastructure to enable multiple on demand services for multiple devices, including the Streaming Media services to PC and other video enabled devices.

There are several aspects in consideration of using the architecture to support a shared Streaming Media platform.
  Shared asset distribution and asset management system.
  Shared session and resource management.
  Shared streaming servers.
  Shared entitlement and billing system.

The future digital set-top box may support MPEG-4 in addition to MPEG-2, and may be able to receive content over IP/DOCSIS. This will enable the possibility of digital set-top box accessing the same content as the streaming media services to PC.

Figure 6:
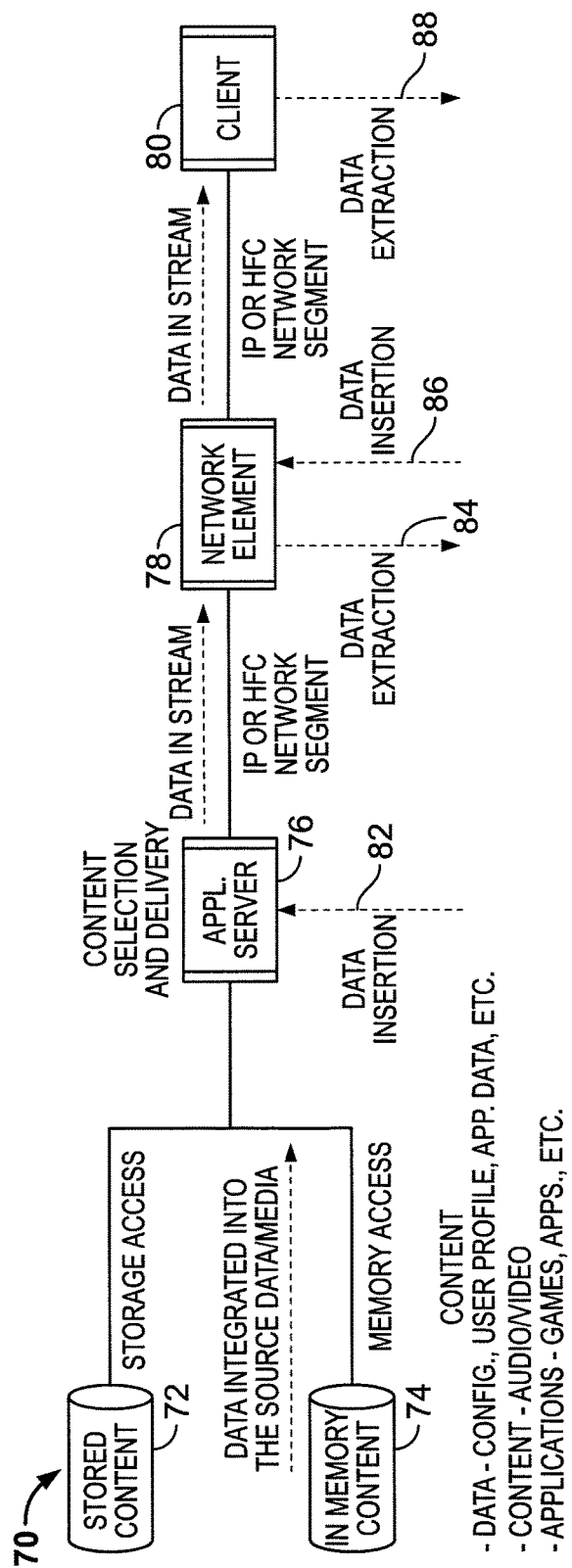
FIG. 6 illustrates supplemental data being carried in the content data as it traverses the network transport.

FIG. 6 illustrates an implementation of the use of in-stream data within the content delivery path in the preferred architecture for on demand services. The architecture is generally indicated at 70, with stored content indicated at 72 and in memory content indicated at 74. Application server 76 performs content selection and initiates delivery. The content delivery path extends from application server 76 through the network transport including network element 78, to client 80. The network transport may include any number of intervening servers or intervening network elements.

In this illustrated example, data from in memory content 74 is integrated into the source data/media from stored content 72, and at application server 76, supplemental data is inserted in-stream (arrow 82). In the remainder of the network transport, data may be inserted into or extracted from the content stream at any network element. This is shown at network element 78 (data extraction indicated by arrow 84 and data insertion indicated by arrow 86) and at client 80 (data extraction indicated by arrow 88). In this way, supplemental data may be carried in the content data as it traverses the IP or HFC network segments. Data can be extracted from the stream for a variety of purposes. At any point in the flow, data may be passed through or added to for delivery to a downstream network element or end point. Instream markers may be used as incremental descriptors to provide more information about a source device or signal. For example, such an incremental descriptor may be used to identify an edge QAM.

Figure 7:
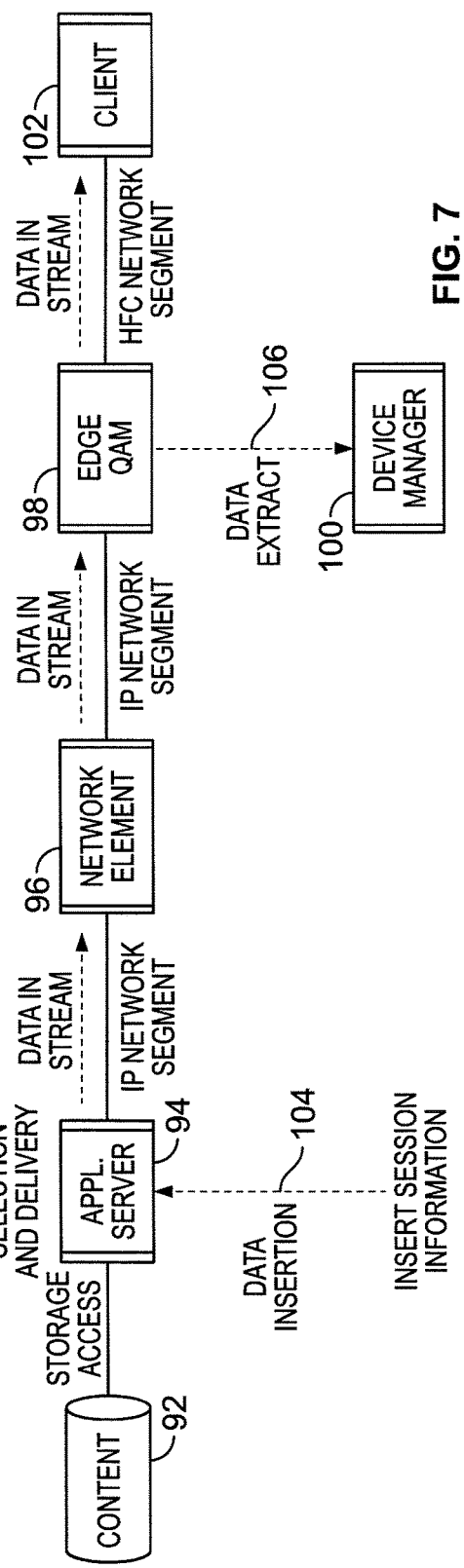
FIG. 7 illustrates an implementation of the invention for stateless recovery of session information, and shows session information being carried in the content data as it traverses the network transport, with the session information being extracted to restore a device manager.

FIG. 7 illustrates an implementation of the stateless recovery of session information in the preferred architecture for on demand services. In-stream data is used within the content delivery path to make session information recovery possible. The architecture is indicated at 90. Content 92 is selected and delivered by application server 94. The content delivery path extends from application server 94, through network element 96, to edge quadrature amplitude modulator (QAM) 98 and finally to client 102. The device manager is indicated at 100.

The edge QAM device manager 100 is responsible for allocating HFC bandwidth for the delivery of on demand content. An external entity (for example, the session resource manager) comes to the device manager 100 to request resources. Typically, a device manager stores the state of all edge QAMs, and is thus able to manage the resources. If the device manager 100 fails, a new or backup unit can be installed and the state of all edge QAMs restored from the in-stream data in accordance with the invention. More specifically, session information for the current session is inserted into the content stream at application server 94, as indicated by data insertion arrow 104. When necessary, this data can be extracted at edge QAM 98 as indicated by data extraction arrow 106 for providing information to device manager 100. This approach is quite useful in on demand architectures, including VOD implementations.

In an exemplary of VOD implementation, the service session resource manager is provided by the VOD vendor. In large deployments, multiple resource managers are installed to balance the load and provide for fault tolerance. This scheme mandates that current resource usage be kept consistent between the resource managers. This has proven to be an obstacle in high volume scenarios since the states of all resources are difficult to keep synchronized. By applying the in-stream data mechanisms contemplated by the invention, a device manager does not have to support a robust view of the resource usage it controls. In the event of a failure, the utilization can be refreshed in a time consistent with the repetition rate of the in-stream data.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
  receiving, by a computing device, a stream comprising requested content data;
  receiving utilization information indicating resources of a second device configured for sending the requested content data to a first device, wherein the resources of the second device comprise resources being used by the second device for communication of the requested content data to the first device, wherein the resources of the second device comprise input resources of the second device and output resources of the second device, and wherein at least one of the input resources is different from at least one of the output resources;
  generating a modified stream comprising the requested content data and the utilization information; and
  causing, by sending the utilization information via the modified stream, configuration of a device manager, separate from the second device, to manage the resources of the second device.

2. The method of claim 1, wherein the resources of the second device comprise a bandwidth of the second device.

3. The method of claim 1, wherein the requested content data comprises video on demand (VOD) content and wherein the utilization information comprises an indication of a port.

4. The method of claim 1, wherein causing configuration of the device manager comprises sending the modified stream via an Internet protocol network segment, and wherein the resources of the second device comprise resources used to send the requested content data via a hybrid fiber coax network segment.

5. The method of claim 1,
wherein the requested content data comprises video on demand (VOD) content data, and
wherein the utilization information comprises an indication of an allocated bandwidth of a hybrid fiber coax network segment.

6. The method of claim 1, wherein the requested content data comprises switched broadcast video.

7. The method of claim 1, wherein the resources of the second device comprise an encryption engine.

8. The method of claim 1, wherein the utilization information comprises frequency and MPEG tuning information.

9. The method of claim 1, wherein the second device comprises an edge quadrature amplitude modulator.

10. The method of claim 1, wherein the configuration of the device manager comprises restoration of session information.

11. The method of claim 1, wherein the resources of the second device comprise data configured to allow service group autodiscovery by the first device.

12. The method of claim 1, wherein:
the input resources comprise at least one of: a user datagram protocol (UDP) port, an Internet Protocol (IP) address, or an input MPEG program parameter, and
the output resources comprise at least one of: a frequency or an output MPEG program parameter.

13. A system comprising:
a first device;
a second device configured for sending requested content data to the first device; and
a server configured to:
receive a stream comprising the requested content data;
receive utilization information indicating resources of the second device, wherein the resources of the second device comprise resources being used by the second device for communication of the requested content data to the first device, wherein the resources of the second device comprise input resources of the second device and output resources of the second device, and wherein at least one of the input resources is different from at least one of the output resources;
generate a modified stream comprising the requested content data and the utilization information; and
cause, by sending the utilization information via the modified stream, configuration of a device manager, separate from the second device, to manage the resources of the second device.

14. The system of claim 13, wherein the resources of the second device comprise a bandwidth of the second device.

15. The system of claim 13, wherein the server is configured to cause configuration of the device manager by sending the modified stream via an Internet protocol network segment, and wherein the resources of the second device comprise resources used to send the requested content data via a hybrid fiber coax network segment.

16. The system of claim 13, wherein the requested content data comprises video on demand (VOD) content data, and wherein the utilization information comprises an indication of an allocated bandwidth of a hybrid fiber coax network segment.

17. The system of claim 13, wherein the requested content data comprises switched broadcast video.

18. The system of claim 13, wherein the resources of the second device comprise an encryption engine.

19. The system of claim 13, wherein the utilization information comprises frequency and MPEG tuning information.

20. The system of claim 13, wherein the second device comprises an edge quadrature amplitude modulator.

21. The system of claim 13, wherein the configuration of the device manager comprises restoration of session information.

22. The system of claim 13, wherein the resources of the second device comprise data configured to allow service group autodiscovery by the first device.

23. The system of claim 13, wherein:
the input resources comprise at least one of: a user datagram protocol (UDP) port, an Internet Protocol (IP) address, or an input MPEG program parameter, and
the output resources comprise at least one of: a frequency or an output MPEG program parameter.

24. A method comprising:
receiving, by a computing device, a stream comprising requested content data;
receiving, via a device manager that manages resources of a plurality of second devices, utilization information indicating resources of a second device, of the plurality of second devices, configured for sending the requested content data to a first device, wherein the resources of the second device comprise resources being used for communication of the requested content data, wherein the resources of the second device comprise input resources of the second device and output resources of the second device, and wherein at least one of the input resources is different from at least one of the output resources;
generating a modified stream comprising the requested content data and the utilization information; and
causing, by sending the utilization information via the modified stream, configuration of another device manager to manage the resources of the plurality of second devices.

25. The method of claim 24, wherein the another device manager comprises a new or back-up unit, and wherein the configuration of the another device manager comprises refreshing of utilization after a failure of the device manager.

26. The method of claim 24, wherein the resources of the second device comprise a bandwidth.

27. The method of claim 24, wherein the requested content data comprises video on demand (VOD) content.

28. The method of claim 24, wherein the plurality of second devices comprises a plurality of edge quadrature amplitude modulators.

29. The method of claim 24, wherein the configuration of the another device manager comprises restoration of session information.

30. The method of claim 24, wherein the utilization information comprises information extracted from the second device.

31. The method of claim 24, wherein the resources of the second device comprise resources being used by the second device for communication of the requested content data to the first device.

32. The method of claim 24, wherein:
  the input resources comprise at least one of: a user datagram protocol (UDP) port, an Internet Protocol (IP) address, or an input MPEG program parameter, and
  the output resources comprise at least one of: a frequency or an output MPEG program parameter.

* * * * *

UNITED STATES PATENT AND TRADEMARK OFFICE
CERTIFICATE OF CORRECTION

| | | |
|---|---|---|
| PATENT NO. | : 11,140,362 B2 | |
| APPLICATION NO. | : 12/971812 | |
| DATED | : October 5, 2021 | |
| INVENTOR(S) | : Michel | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 63 days.

Signed and Sealed this
Twentieth Day of December, 2022

*Katherine Kelly Vidal*

Katherine Kelly Vidal
*Director of the United States Patent and Trademark Office*